United States Patent
Franck

(10) Patent No.: US 10,190,443 B2
(45) Date of Patent: Jan. 29, 2019

(54) STEAM ACCUMULATOR COMPRISING A LATENT HEAT ACCUMULATOR AND A STEAM THERMOCOMPRESSOR

(71) Applicant: CURRENTA GMBH & CO. OHG, Leverkusen (DE)

(72) Inventor: Rüdiger Franck, Leverkusen (DE)

(73) Assignee: CURRENTA GMBH & CO. OHG, Leverkusen (DE)

( * ) Notice: Subject to any disclaimer, the term of this patent is extended or adjusted under 35 U.S.C. 154(b) by 55 days.

(21) Appl. No.: 15/103,530

(22) PCT Filed: Dec. 9, 2014

(86) PCT No.: PCT/EP2014/077031
§ 371 (c)(1),
(2) Date: Jun. 10, 2016

(87) PCT Pub. No.: WO2015/086588
PCT Pub. Date: Jun. 18, 2015

(65) Prior Publication Data
US 2016/0290170 A1    Oct. 6, 2016

(30) Foreign Application Priority Data

Dec. 11, 2013    (DE) .................. 10 2013 225 543

(51) Int. Cl.
| | |
|---|---|
| *F01K 1/08* | (2006.01) |
| *F01K 3/00* | (2006.01) |
| *F01K 17/04* | (2006.01) |
| *F01K 17/00* | (2006.01) |

(52) U.S. Cl.
CPC ............. *F01K 1/08* (2013.01); *F01K 3/006* (2013.01); *F01K 17/00* (2013.01); *F01K 17/04* (2013.01); *Y02E 20/14* (2013.01); *Y02P 80/15* (2015.11)

(58) Field of Classification Search
CPC ..... F01K 1/12; F01K 3/12; F01K 1/08; F01K 17/00; F01K 17/04; F01K 3/006; Y02E 20/14; Y02P 80/15
See application file for complete search history.

(56) References Cited

U.S. PATENT DOCUMENTS

| | | | |
|---|---|---|---|
| 4,389,847 A | 6/1983 | Kehlhofer | |
| 4,589,890 A * | 5/1986 | Gronvaldt | B01D 53/04 502/55 |
| 5,535,584 A * | 7/1996 | Janes | F01D 1/00 60/39.12 |
| 6,141,955 A * | 11/2000 | Akiyama | F01K 21/047 60/39.15 |

(Continued)

FOREIGN PATENT DOCUMENTS

| | | | |
|---|---|---|---|
| CH | 184689 A | 6/1936 | |
| CH | 240453 A | 12/1945 | |

(Continued)

*Primary Examiner* — Phutthiwat Wongwian
*Assistant Examiner* — Matthew T Largi
(74) *Attorney, Agent, or Firm* — McBee Moore Woodward & Vanik IP, LLC

(57) ABSTRACT

The present invention relates to a method for decoupling the provision of electricity and high-pressure steam of a combined heat and power plant which has the primary purpose of providing process steam, i.e. which is heat-led.

20 Claims, 2 Drawing Sheets

(56) References Cited

U.S. PATENT DOCUMENTS

| | | | |
|---|---|---|---|
| 6,484,501 B1 * | 11/2002 | Mieth | F01K 23/065 60/618 |
| 6,782,638 B1 | 8/2004 | Svenland | |
| 8,091,361 B1 * | 1/2012 | Lang | F01K 3/002 60/653 |
| 2005/0072154 A1 * | 4/2005 | Frutschi | F01K 21/04 60/670 |
| 2013/0133326 A1 * | 5/2013 | Jonsson | F01K 17/04 60/648 |
| 2014/0208752 A1 * | 7/2014 | Palanisamy | F01K 3/004 60/648 |
| 2014/0318130 A1 | 10/2014 | Duong | |

FOREIGN PATENT DOCUMENTS

| | | | |
|---|---|---|---|
| DE | 399300 C | 7/1924 | |
| DE | 24 58 961 A1 | 6/1976 | |
| DE | 36 30 546 A1 | 3/1988 | |
| DE | 195 35 318 A1 | 3/1997 | |
| DE | 10 2007 046 854 B3 | 11/2008 | |
| DE | 102007046854 B3 * | 11/2008 | |
| EP | 0 026 798 A1 | 4/1981 | |
| FR | 2 984 400 A1 | 6/2013 | |
| JP | S54-028957 A | 3/1979 | |
| JP | H05-065808 A | 3/1993 | |
| WO | 01/27388 A1 | 4/2001 | |
| WO | WO 0127388 A1 * | 4/2001 | D21F 5/028 |

\* cited by examiner

STEAM ACCUMULATOR COMPRISING A LATENT HEAT ACCUMULATOR AND A STEAM THERMOCOMPRESSOR

CROSS-REFERENCE TO RELATED APPLICATIONS

This application is a 371 of PCT/EP2014/077031, filed Dec. 9, 2014, which claims foreign priority benefit under 35 U.S.C. § 119 of German Application 10 2013 225 543.8 filed Dec. 11, 2013, the disclosures of which are incorporated herein by reference.

BACKGROUND OF THE INVENTION

Field of the Invention

The instant invention relates to the field of power generation, specifically, conservation of heat energy produced by steam generated during power generation, and more specifically, to storage and use of heat energy produced by steam.

Description of Related Art

The present invention relates to a method for decoupling the provision of electricity and high-pressure steam of a combined heat and power plant which has the primary purpose of providing process steam, i.e. which is heat-led operated.

The increasing generation of electricity from fluctuating renewable energy (FRE) sources requires increased flexibility for thermal power plants, in particular industrial combined heat and power plants (CHP plants) which, due to their high degree of utilization, are of prominent importance in the energy transition. Measures for increasing the flexibility of power plants can relate to broadening the power range and increasing the power change rate.

Industrial CHP plants with back-pressure turbines and/or turbine bleeding simultaneously provide, from fresh steam, heat in the form of high-pressure process steam and electricity. Therefore, the term steam supply system is used therefor in the following. In heat-led operation, the demand of the steam consumers determines the degree of electricity generation. With interim storage of the process steam, the electricity generation power can be set independently of the steam consumption. It is thus possible, for the duration of decoupled operation, to temporally shift power of the CHP plant. The duration of decoupled operation is limited by the capacity of the steam storage.

In the case of CHP plants, flexibility of the generating power can be achieved by decoupling the provision of heat and electricity. This allows the CHP electricity generation power to be changed independently of the heat requirement.

In decoupled operation, the power of the electricity generation of the CHP plant can be increased as required, when the FRE supply is low, and vice versa reduced when the FRE supply is high. When demand for electricity is high, excess process steam is generated and stored in the interim. When demand for electricity is low, process steam is provided from the steam store and the CHP electricity generation is operated at reduced power.

The interim storage of the steam also allows the load-change rates of the steam supply and of the electricity generation to be changed independently of one another. This results in a possibility for increasing the power-change rate of the electricity generation which requires no technical changes to the steam generation. High change speeds for the thermal electricity generation are required in order to equalize steep power gradients of the FRE. The provision of rapidly controllable electrical power is a service which is traded as control power.

The supply of and demand for electricity generation are traded for example on the spot market of the European Power Exchange (EPEX) and the provision of control power is procured by the transmission grid operators.

One possibility for the interim storage of steam in a storage system consists in condensing steam and transferring the condensation heat which is released into a latent heat store, and the heat from desuperheating the steam and from subcooling the condensate into sensible heat stores.

Latent heat stores use so-called phase-change storage media whose latent heat of fusion, of solution or of absorption is substantially greater than the heat which they can store on the basis of their normal specific heat capacity (without the phase-change effect). Known exemplary applications for latent heat stores are heat packs, freezer blocks or paraffin-filled storage elements in the tanks of solar thermal installations.

Advantages of latent heat stores are the relatively high specific storage capacity of latent heat storage materials and a low required temperature difference between the charge and discharge steam in comparison to heat storage in a sensible storage medium.

In spite of the advantages of storing the heat of condensation of the steam in a latent heat store (phase-change storage medium), there remains a grave problem which greatly limits the potential for increasing the flexibility of industrial CHP. Due to the temperature difference of the heat transfer between the storage medium and the condensing steam or evaporating water, saturated discharge steam given off namely during discharging of the latent heat store is at a lower temperature and thus always entails a lower pressure than the process steam used for charging. For that reason, the discharge steam cannot be fed back into the steam supply system at the pressure stage of the process steam used for charging.

This problem of the pressure differential between charge and discharge steam is known from the integration of sliding-pressure stores in steam supply systems. For that reason, they are charged with a higher pressure than that of the steam which is to be discharged.

In a method for rapidly increasing the power of a steam turbine plant (EP 0 026 798 A1), it is proposed to charge a sliding-pressure store with steam from the supply line of a back-pressure turbine or from turbine bleeding in order to be able to feed saturated discharge steam from the store back in at the back-pressure stage.

In another proposal (DE000002458961A1, Dampfspeicheranlage), a sliding-pressure store is charged with hot water from a high pressure stage. By transferring heat from the hot water supply to the extraction steam of the sliding-pressure store, it is possible with this arrangement to provide superheated and not only saturated steam.

In another example, steam for charging a sliding-pressure store is compressed in order to be able to return the discharge steam to the pressure stage of the steam used for charging (CH 240 453 A, Dampf-Heizanlage mit Speicher).

A pressure increase is also used in a proposal (DE 399 300 A, Wärmespeicheranlage für Gegendruckdampfmaschinen) in which a first low-pressure sliding-pressure store is charged from the discharge line of the back-pressure side of a turbine. With the aid of a compressor which is operated with steam from the supply line of the back-pressure turbine, a second sliding-pressure store at a higher pressure level is charged from the low-pressure store. This second store can in turn, if required, feed discharge steam to the turbine or to the back-pressure stage. Either the first or the second sliding-pressure store is charged, depending on which pressure stage has excess steam.

There is also a proposal to compress the charge steam beyond the degree which is required for feeding back into the steam grid, in order to achieve an increase in the storage density of the sliding-pressure store (CH 184 689 A, steam plant with heat store charged by excess steam).

These examples propose, for compressing the steam, steam- or electrically-operated mechanical compressors and, in part, steam thermocompressors (jet apparatuses).

Latent heat stores are distinguished from sliding-pressure stores by a higher storage density and they do not have the drawback of sliding-pressure stores that, as they discharge, the pressure of the discharge steam drops.

The potential of the steam storage for increasing the flexibility of CHP plants can only be exploited if it is possible to work with high storage densities and with a cost-effective, robust and flexible solution for returning process steam at constant pressure to the pressure stage of the provision.

Mechanical compressors such as turbo compressors, which can be used for large steam flow rates, do not satisfy these requirements. They have, for example, high acquisition costs and, for short-notice start-up and shutdown processes, they must be kept hot in standby, such that their flexible use is onerous.

There was therefore the unchanged need to provide a method for the interim storage of steam from a power plant, in particular a CHP plant, by means of which it was possible to shift the power thereof and/or make this power more dynamic, and in which, when the store is discharged, process steam stored in the interim is fed back into the steam supply system at the pressure level at which process steam was drawn for charging the store.

BRIEF SUMMARY OF THE INVENTION

It has been surprisingly found that the above-described problem can be solved by connecting one or more steam thermocompressors and one or more storage systems, each having a latent heat store for taking up the heat of condensation of the process steam of the CHP plant.

Steam thermocompressors make it possible to compress low-pressure intake steam with the aid of higher-pressure propellant steam. Since, in a CHP plant for industrial steam supply, steam is provided at different pressure stages, it is quite possible to supply the thermocompressor with propellant steam.

Steam thermocompressors have no moving parts. For that reason, they are robust and suitable for flexible use.

Steam thermocompressors are proven components which are offered by various manufacturers. They are often used at pressures lower than those which are common in a CHP plant for steam supply, e.g. for heat recovery and for cooling. It is also proposed to use them in the field of power plants in order to optimise the use of energy (DE 19535318A1; Verfahren and Anordnung zum Vorwärmen des Speisewassers eines Dampferzeugers in Kraftwerksprozessen, FR2984400A1, Procedé et Installation de Cogeneration avec Thermocompression). It was therefore unexpected, to a person skilled in the art, that they can also be used in the field of increasing power plant flexibility, in the method or system according to the invention.

Thus, the present invention relates first to a method for increasing the flexibility of a thermal power plant, preferably an industrial CHP plant, involving the interim storage of the heat of condensation of the process steam of the power plant or of the CHP plant in at least one latent heat store, characterized in that at least one latent heat store is connected to the CHP plant via at least one steam thermocompressor such that the store discharge steam can be provided at the pressure level of the process steam at which the latent heat store was charged.

When transferring, in the heat exchanger, the heat released during condensation of the process steam to the phase-change material which takes up the heat and with which the latent heat store is provided, the temperature at which the phase change of the phase-change material takes place is lower than the temperature at which process steam at the selected pressure stage condenses. In the same manner, when discharging the store in order to transfer the heat contained in the phase-change material to the resulting discharge steam, the temperature of the resulting steam is lower than the temperature of the phase change. This has the consequence that the discharge steam which can be extracted when discharging the store is at a lower pressure than the process steam used for charging the store.

In order that the discharge steam can be fed into the steam supply system at the pressure stage of the process steam used for charging, a steam thermocompressor or multiple steam thermocompressors is/are integrated into the process. The connection can take place on the charge side or on the discharge side of the storage system. In the case of integration on the charge side, the phase-change temperature is raised such that the discharge steam can be fed in at the pressure stage of the process steam used for charging. In the case of integration of the steam thermocompression on the discharge side of the storage system, the discharge steam is raised by thermocompression to the pressure stage of the process steam used for charging.

The integration of multiple steam thermocompressors in the steam supply system can be effected in modular fashion. They can for example be connected in parallel in order to cover a larger power range. They can also be controlled.

In accordance with various embodiments of the method according to the invention, the process integration of the steam thermocompression can be effected on the charge or discharge side of the storage system.

It is also possible, in the method according to the invention, to charge multiple separate storage systems at different pressure stages of the steam supply system with process steam of the respective pressure stage. By virtue of the integration of thermocompressors which are operated with steam from the respective superordinate pressure stage as propellant steam, the discharge steam of the storage system can be fed back into the steam supply system at the respective pressure stage.

The method according to the invention decouples the provision of process steam and of electricity for a limited time, allowing power to be temporally shifted.

The method according to the invention also allows the power change rate of the electricity generation to be increased in the case of reducing power or in the case of increasing power, independently of the power change rate of the steam generation.

If, for example, the generator power is reduced with a steeper load ramp, as is possible by reducing the power of the steam generator, steam is expanded via a turbine bypass station (FIG. 2) instead of through the turbine, and the excess quantity of steam produced as a consequence of injection cooling is stored in the interim. Conversely, return-feeding interim-stored steam allows the generator power to be raised faster than by increasing the power of the steam generator.

There follows a more detailed description, by way of example, of two preferred embodiments of the method according to the invention.

DETAILED DESCRIPTION OF THE INVENTION

The steam thermocompressor can for example be used, according to a first preferred embodiment, during discharge of the storage system.

Figure 1:
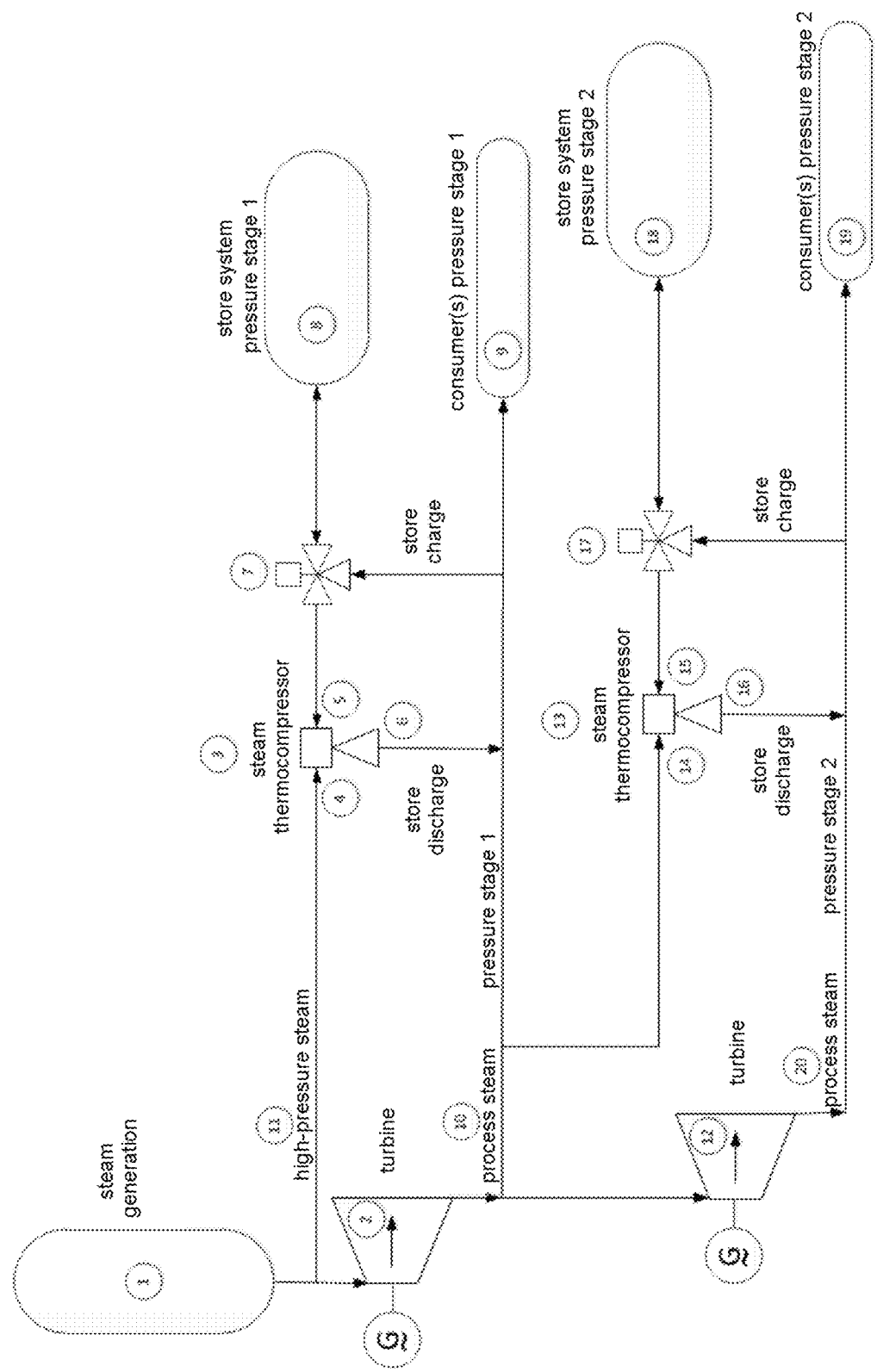
FIG. 1 illustrates a method according to a first preferred embodiment of the invention as described herein

In this configuration, which is illustrated in FIG. 1, the pressure of the discharge steam is raised by thermocompression to the pressure level of the process steam used for charging. In the illustration, valves are included only for clarification. For charging the storage system, process steam 10 of pressure stage 1 is fed via the valve 7 to the storage system 8 of pressure stage 1. When the storage system 8 is discharged, the steam thermocompressor 3 is connected to high-pressure steam 11 on the driving side 4 and is connected via the valve 7 to the storage system 8 on the suction side 5. The high-pressure steam 11 is taken from the steam generation 1 or from a line directly connected thereto. The compressed discharge steam is fed, via the outlet 6 of the thermocompressor 3, back into the steam supply system as process steam 10 at the pressure stage 1. The use of the high-pressure steam 11 as propellant steam for operating the thermocompressor 3 takes place, in this configuration, specifically in those time intervals in which the demand for current is low and high-pressure steam is made to flow via the turbine 2 with reduced power. In periods of high demand for electricity, by contrast, the turbine 2 is operated at high power and the steam storage system 8 is charged using the quantity of process steam that exceeds the requirements of the steam consumers 9 of pressure stage 1 (power shifting).

FIG. 1 also illustrates the possibility of integrating a second storage system 18 for process steam 20 at a lower pressure stage 2. Storing the process steam 20 in the storage system 18 is effected via the valve 17. When the storage system 18 is discharged, the steam thermocompressor 13 is connected to process steam 10 from pressure stage 1 on the driving side 14 and is connected to the storage system 18 via the valve 17 on the suction side 15. The compressed discharge steam is fed, via the outlet 16 of the thermocompressor 13, back to pressure stage 2 of the steam supply system as process steam 20. In periods of high demand for electricity, and when the turbine 2 and the turbine 12 are at high power, the steam storage system 18 at pressure stage 2 is charged using process steam 20 from pressure stage 2, specifically using that quantity which exceeds the requirements of the consumers 19 at pressure stage 2 at that time. In periods of low demand for electricity, turbines 2 and 12 are operated at low power or not at all, and supplying the consumers 19 with process steam 20 from pressure stage 2 is supported or taken over by discharging the store 18 of pressure stage 2.

By decoupling the provision of electricity and of process steam, this arrangement makes electrical power from the CHP plants available in periods of high demand for power. The excess steam produced in that context is stored in the interim and, in the discharge phase after thermocompression, covers the process steam requirements.

According to another preferred embodiment, the steam thermocompressor can also be used during charging of the storage system, instead of on the discharge side.

Figure 2:
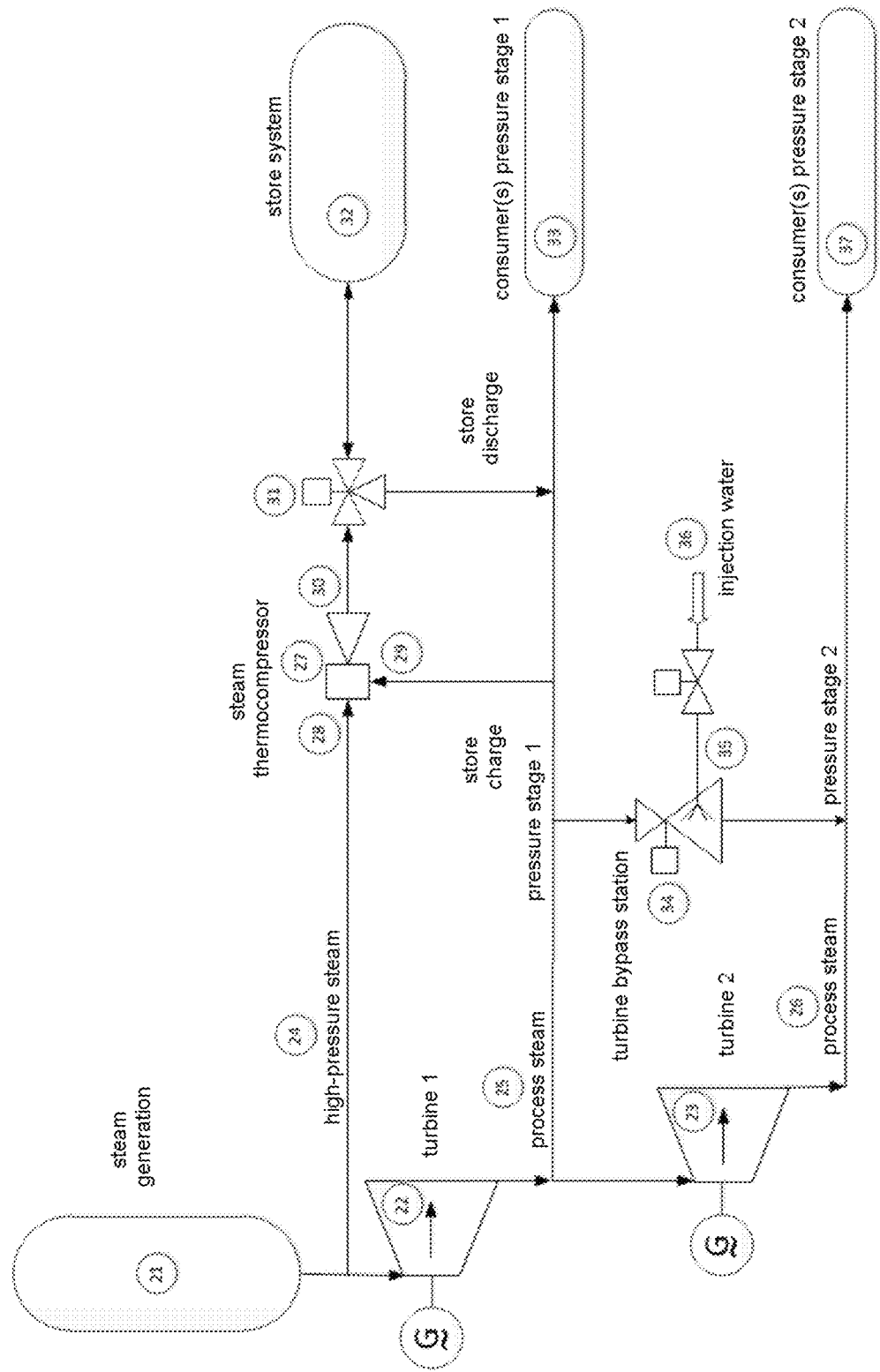
FIG. 2 illustrates a method according to a second preferred embodiment of the invention as described herein.

In such an arrangement, as is illustrated in FIG. 2, the condensation temperature is raised, by raising the pressure of the process steam used for charging, such that, when the store is discharged, the steam given off is at the pressure level of the process steam used for charging.

This configuration can be used to increase the gradient of the power ramp of the electricity generation with respect to a power change rate which can be achieved solely by a reduction in steam generation (power dynamization). When a steep reduction in electrical power is required, e.g. for the provision of control power, process steam 25 from pressure stage 1 is expanded, bypassing turbine 23, via a turbine bypass station 34 with injection cooling 35, to pressure stage 2, and the power of turbine 23 is reduced. The temperature of the steam throttled in turbine bypass station 34 is set, by injection of injection water 36 by means of the injection cooling 35, to the temperature of the process steam 26 of pressure stage 2. The additional quantity of steam produced in that context results in the quantity of steam produced temporarily exceeding the requirements of the consumers 33 and 37. Process steam 25 from pressure stage 1 is therefore stored in the interim and is fed, on the suction side 29, to the steam thermocompressor 27. The thermocompressor is operated using high-pressure steam 24 via the driving side 28. The high-pressure steam 24 is taken from the steam generation 21 or from a line directly connected thereto. The compressed process steam at the outlet 30 of the thermocompressor is fed, via the valve 31, to the storage system 32 for charging. At the same time, the power of the steam generation 21 is continuously reduced, until there is no longer any process steam exceeding consumption to be stored.

At the end of the cycle of providing control energy, the electrical power must be raised back up to the original power level prior to provision of the control energy, and specifically in a time interval of the same duration as for reducing the power. In the configuration illustrated here, in this phase all of the high-pressure steam and the discharge steam from the storage system 32 are available.

At the end of the provision of control energy, the turbine bypass station 34 and the device for injection cooling 35 are closed and process steam 25 from pressure stage 1 is expanded via a turbine 23 to give process steam 26 of pressure stage 2. At the same time, discharging of the storage system 32 is initiated. To that end, the discharge steam is fed via the valve 31 to supply process steam 25 of pressure stage 1. At the same time as the storage system 32 is discharged, the steam generation 21 is run up until the point at which, without feed-in of discharge steam, the electrical power of the CHP plant has reached the original level from the beginning of the cycle of control power provision.

The two above-described configuration variants and the applications assigned thereto are only examples. It is thus for example also conceivable to integrate a storage system at pressure stage 1 of the steam supply system with thermocompression on the discharge side and to integrate a turbine bypass station bypassing the turbine between pressure stage 1 and pressure stage 2.

One aspect of the present invention is the use of a storage system for process steam which consists of multiple storage modules that respectively take up the desuperheating heat, the heat of condensation and the heat released during subcooling of the condensate, and in which the storage module for taking up the heat of condensation operates at constant temperature and is preferably a latent heat store. Also conceivable is a heat store which stores the thermal energy at constant temperature in the form of chemically bound energy.

The method according to the invention is characterized in that such a storage system is integrated into the steam supply system, by integration of a steam thermocompressor or multiple steam thermocompressors, such that store discharge steam can be provided at the pressure level of the process steam with which the storage system was charged.

In the method according to the invention, it is also possible to charge multiple separate storage systems at different pressure stages of the steam supply system using process steam from the respective pressure stage. Integrating thermocompressors which are operated using steam from the respectively superordinate pressure stage as propellant steam makes it possible to feed the discharge steam back into the supply system for process steam at the respective pressure stage.

The storage system according to the invention decouples the provision of process steam and of electricity for a limited time interval, and power can be temporally shifted.

The method according to the invention also makes it possible to increase the power change rate of the electricity generation when power is reduced or increased, independently of the power change rate of the steam generation.

What is claimed is:

1. A method of temporarily decoupling steam generation and production of electrical power in a thermal power plant system, the system including:
    a steam generator;
    at least one thermocompressor, said at least one thermocompressor including:
        a drive side connected to said steam generator;
        a suction side; and,
        an outlet;
    a first heat storage device;
    a three-way valve coupled between said at least one thermocompressor and said first heat storage device;
    at least one turbine having an inlet and an outlet wherein said inlet is connected to said steam generator; and,
    a first process steam line having a first end connected to said outlet of said at least one turbine, a second end directed to at least one steam consumer, a first intermediate connection with said at least one thermocompressor, and a second intermediate connection with said three-way valve;
    the method comprising;
    discharging heat from said first heat storage device through said three-way valve to said suction side of said at least one thermocompressor;
    receiving high pressure steam from said steam generator into said drive side of said at least one thermocompressor; and,
    expelling said heat from said outlet of said at least one thermocompressor through said first process steam line to said at least one steam consumer;
    wherein the method is operated when a steam pressure from said outlet of said at least one turbine to said steam process line is low; and,
    when demand for electrical power generation is low.

2. The method of claim 1 further comprising supplying high pressure steam from said steam generator to said drive side of said at least one thermocompressor.

3. The method of claim 1 wherein said system further includes:
    at least one additional turbine having an inlet and an outlet;
    a second steam process line having a first end connected to said outlet of said at least one additional turbine and a second end directed to an additional steam consumer;
    at least one additional heat storage device;
    at least one additional three-way valve connected to said at least one additional heat storage device;
    at least one additional thermocompressor having a drive side connected to said first process steam line, a suction side connected to said at least one additional three-way valve, and an outlet connected to an intermediate connection on said second steam process line;
    wherein said inlet of said at least one additional turbine is connected to said outlet of said at least one turbine and said first steam process line;
    the method further comprising:
    discharging steam from said at least one additional heat storage device through said at least one additional three-way valve to said suction side of said at least one additional thermocompressor;
    and,
    expelling heat from said outlet of said at least one additional thermocompressor through said second process steam line to said additional steam consumer.

4. The method of claim 3 further comprising supplying low pressure steam from said at least one turbine through said first process steam line to said suction side of said at least one additional thermocompressor.

5. The method of claim 2 further comprising recharging said first heat storage device by passing steam from said outlet of said at least one steam turbine through said three-way valve to said first heat storage device;
    wherein the method is operated when said at least one steam turbine is operated at high power;
    when the quantity of charging steam exceeds the requirements of said at least one steam consumer; and,
    when the demand for electricity has changed from low to high.

6. The method of claim 3 further comprising recharging said at least one additional heat storage device by passing steam from said at least one additional turbine through said at least one additional three-way valve to said at least one additional heat storage device;
    wherein the method is operated when said at least one steam turbine is operated at high power;
    when the quantity of charging steam exceeds the requirements of said at least one steam consumer; and,
    when the demand for electricity has changed from low to high.

7. A method of temporarily decoupling steam generation and production of electrical power in a thermal power plant system, the system including:
    a steam generator;
    at least one thermocompressor, said at least one thermocompressor including:
        a drive side connected to said steam generator;
        a suction side; and,
        an outlet;
    a first heat storage device;

a three-way valve coupled between said outlet of said at least one thermocompressor and said first heat storage device;
at least one turbine having an inlet and an outlet wherein said inlet is connected to said steam generator; and,
a first process steam line having a first end connected to said outlet of said at least one turbine, a second end directed to at least one steam consumer, and a first intermediate connection with said at least one thermocompressor and a second intermediate connection with said three-way valve; the method comprising:
charging said first heat storage device with high pressure steam from said steam generator through the drive side of said at least one thermocompressor and said outlet of said at least one thermocompressor and said three-way valve thereby raising a condensation temperature of said first heat storage device; and,
discharging said first heat storage device through said three-way valve to said at least one steam consumer;
wherein a pressure of a discharge steam is equivalent to the pressure of said high pressure steam.

8. The method of claim 7 wherein said system further includes:
at least one additional turbine having an inlet connected to said outlet of said at least one turbine and an outlet;
a turbine bypass connected to said first process steam line;
a cooling device connected to said turbine bypass;
a second process steam line having a first end connected to said outlet of said at least one additional turbine, an intermediate connection to said turbine bypass, and a second end connected to a second at least one steam consumer;
the method further comprising:
emitting high pressure process steam from said outlet of said at least one turbine through said turbine bypass and said second process line to said second at least one steam consumer;
injecting cooling water from said cooling device into said steam passing through said bypass to bring the temperature of the steam passing through the bypass to the equivalent to a temperature of steam in said second process steam line; and,
reducing power emitted from said outlet of said at least one additional turbine by reducing steam received by said at least one additional turbine from said at least one turbine.

9. The method of claim 8 further comprising movement of said process steam from said first process steam line through said suction side of said at least one thermocompressor and said three-way valve to said first heat storage device, thereby charging said first heat storage device.

10. The method of claim 8 further comprising:
closing said turbine bypass and said cooling device;
increasing said pressure of steam in said second process steam line from said outlet of said at least one additional turbine to supply power to said second at least one steam consumer;
discharging process steam from said first heat storage device through said three-way valve to said first process steam line and said at least one steam consumer; when electrical demand is increased.

11. The method of claim 10 further comprising:
simultaneously with discharging process steam from said first heat storage device increasing generation of steam from said steam generator.

12. A system for enabling the temporary decoupling of electrical generation and power generation in a thermal power plant comprising:
a steam generator;
at least one thermocompressor, said at least one thermocompressor including:
a drive side connected to said steam generator;
a suction side; and,
an outlet;
a first heat storage device;
a three-way valve coupled between said at least one thermocompressor and said first heat storage device;
at least one turbine having an inlet and an outlet wherein said inlet is connected to said steam generator; and,
a first process steam line having a first end connected to said outlet of said at least one turbine, a second end directed to at least one steam consumer, and a first intermediate connection with said at least one thermocompressor and a second intermediate connection with said three-way valve.

13. The system of claim 12 wherein said process steam line is connected to said suction side of said at least one thermocompressor, and said three-way valve is connected to said outlet of said at least one thermocompressor.

14. The system of claim 12 further comprising:
at least one additional turbine having an inlet and an outlet;
a turbine bypass connected to said first process steam line;
a cooling device connected to said turbine bypass;
a second process steam line having a first end connected to said outlet of said at least one additional turbine, an intermediate connection to said turbine bypass, and a second end connected to a second at least one steam consumer.

15. The system of claim 14 wherein steam from said at least one turbine is directed through said first process steam line through said turbine bypass to said second process line to a second steam consumer and wherein a temperature of steam passing though said turbine bypass is cooled by said cooling device to an equal temperature of process steam leaving said outlet of said at least one additional turbine.

16. The system of claim 12 wherein excess steam from said at least one turbine is fed through said suction side of said at least one thermocompressor to charge said at least one storage device using high pressure steam entering said drive side of said at least one thermocompressor from said steam generator, when demand for electrical power is low.

17. The system of claim 12 further comprising:
at least one additional turbine having an inlet and an outlet;
a second steam process line having a first end connected to said outlet of said at least one additional turbine and a second end directed to an additional steam consumer;
at least one additional heat storage device;
at least one additional three-way valve connected to said at least one additional heat storage device;
at least one additional thermocompressor having a drive side connected to said first process steam line, a suction side connected to said at least one additional three-way valve, and an outlet connected to an intermediate connection on said second steam process line;
wherein said inlet of said at least one additional turbine is connected to said outlet of said at least one turbine and said first steam process line.

18. The system of claim 17 wherein stored steam discharges from said first heat storage device through said three-way valve to said suction side of said at least one thermocompressor and exits said outlet of said at least one thermocompressor to said first process steam line; and,
    wherein demand for electric power is low and said at least one turbine operates at low power.

19. The system of claim 17
    wherein steam is discharged from said at least one additional heat storage device through said three-way valve to said suction side of said at least one additional thermocompressor and exits said outlet of said at least one additional thermocompressor to said second process steam line.

20. The system of claim 17:
    wherein said at least one additional turbine operates at high power to produce a quantity of process steam that exceeds the requirements of said steam consumers thereby diverting excess steam through said second process steam line and said at least one additional three-way valve to said at least one additional heat storage device.

\* \* \* \* \*